(12) United States Patent
Anthony

(10) Patent No.: US 6,536,690 B1
(45) Date of Patent: *Mar. 25, 2003

(54) METHOD FOR SEPARATING ELASTOMERIC PARTICULATES FROM FIBERS

(75) Inventor: William S. Anthony, Greenville, MS (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/528,022

(22) Filed: Mar. 17, 2000

Related U.S. Application Data

(63) Continuation-in-part of application No. 09/107,760, filed on Jun. 30, 1998, now abandoned.

(51) Int. Cl.⁷ .............................................. B02C 19/12
(52) U.S. Cl. ................. 241/24.17; 241/24.19; 241/DIG. 31
(58) Field of Search ........................ 241/24.12, 24.17, 241/24.27, 29, 154, 79.1, DIG. 31, 24.19, 24.29; 209/283

(56) References Cited

U.S. PATENT DOCUMENTS

| 1,321,201 A | 11/1919 | Young |
| 2,729,856 A | 1/1956 | Horton et al. |
| 6,325,215 B1 * | 12/2001 | William ........................ 209/21 |

* cited by examiner

Primary Examiner—Mark Rosenbaum
(74) Attorney, Agent, or Firm—John D. Fado; Joseph A. Lipovsky

(57) ABSTRACT

A method for separating non-fibrous particulates from fibers in the substantial absence of water is disclosed. A pulverized mixture of non-fibrous particulates and fibers is introduced into a separation zone containing a plurality of revolving spiked cylinders. Revolving spikes of the respective revolving spiked cylinders contact and separate fibers from the pulverized mixture to produce non-fibrous particulates. The separated fibers have residual non-fibrous particulates which may be removed by the revolving spikes of one revolving spiked cylinders throwing or impelling the separated fibers against and into the revolving spikes of a contiguous revolving spiked cylinder. When the separated fibers impact the spikes of the contiguous revolving spiked cylinder, residual non-fibrous particulates loosen and separate from the removed fibers. The produced non-fibrous particulates have residual polyester fibers which may be removed and reclaimed.

20 Claims, 7 Drawing Sheets

METHOD FOR SEPARATING ELASTOMERIC PARTICULATES FROM FIBERS

This application is a continuation-in-part of application Ser. No. 09/107,760, filed Jun. 30,1998 abn.

BACKGROUND OF THE INVENTION

1. Field of the Invention

The present invention broadly relates to a method for separating non-fibrous particulate from fibers. More particularly, the present invention provides a method for separating elastomeric particulates, such as crumb rubber, from fibers, such as polyester fibers.

2. Description of the Prior Art

The disposal of discarded rubber vehicle tires, especially for cities, states and industries throughout the United States, has been a problem ever since transportation first began to use tires. Billions of discarded tires occupy landfills and stockpiles. For many years, governmental bodies as well as industrial corporations have worked to reduce the growing stockpile of discarded tires. Some states even charge $1.00 to $2.00 on each new tire sold in order to fund disposal and/or disposal research.

Indiscriminate discarding of rubber vehicle tires poses an environmental and health problem. Waste tires provide breeding grounds for insects and rodents. They are not biodegradable and are difficult to store in landfills because their hollow toroidal shape prematurely fills a dumpsite.

The difficulty of discarding worn out rubber tires has led to investments in disposal technologies so that tires will take up less volume when stored in landfills. It has also led to an increased demand for an efficient and cost-effective method of recycling tires to avoid the disposing of worn out tires in landfills.

Recycling of rubber tires is difficult because of the problems associated with separating tires into their multiple components. A tire typically comprises rubber tread and rubber-coated sidewalls. Both natural and synthetic rubbers, including natural rubber, styrene, butadiene (SBR) rubber, polybutadiene rubber, butyl rubber and polyisoprene rubber are used in tire manufacturing. In order that a tire may possess superior strength and wear resistance, the rubber is usually vulcanized, resulting in a toughness for the tire that contributes to its associated indestructibility. Also, a used tire is typically reinforced with belts of steel wire and reinforcing fabric or fiber. These reinforcing components are typically wrapped and bonded together by rubber layers to form a tough, durable tire, all of which impede it's recycling.

The majority of the techniques used to recover recyclable components from waste tires require initial physical processing, such as shredding or cryogenic crushing or pulverizing, followed by further refining with a secondary process, such as converting the materials into a reusable form by chemical digestion, mechanical reclamation, destructive distillation, etc. In cryogenic crushing or pulverizing, liquid nitrogen is used to lower the temperature of the tire to about −300° Fahrenheit. At such low temperatures, rubber hardens and is easily fractured into tiny granules or particulates, leaving steel wire and reinforcing fibers relatively unaffected. The steel wire is removed by electromagnetics and the reinforcing fibers are removed by sieving. The cost of cryogenic processing is relatively high, and typically only about 50% by weight of the rubber granules are recovered. The remaining rubber granules and their admixed or adherent wires and fibers are usually disposed of in landfills.

Young in U.S. Pat. No. 1,321,201 discloses a process for reclaiming rubber and cotton from waste which utilizes a system in which the waste to be separated is first wetted, then formed into a sheet between rollers, before being torn into its component by a high speed picker.

Horton et al. in U.S. Pat. No. 2,729,856 teach a process for separating fibrous vegetable materials into pith and fiber portions. These methods require a hackle and hammer action to free the fibrous material in conjunction with the simultaneous action of water jets.

Therefore, what is needed and what has been invented is a method to avoid the deficiencies of the prior art in recovering recyclable components from waste tires by providing an inexpensive and effective method for recovering rubber particulates from a pulverized tire mixture. What is further needed and what has been invented is a method for separating particulate rubber (e.g. crumb rubber) from fibers (e.g. polyester fibers).

SUMMARY OF THE INVENTION

The present invention accomplishes its desired objects by broadly providing a method for separating non-fibrous particulates from fibers in the substantial absence of water comprising the steps of: (a) providing a pulverized mixture comprising non-fibrous particulates and fibers; and (b) contacting the pulverized mixture of step (a) with a plurality of revolving mixture-engaging structures (e.g., a plurality of revolving spikes) to cause the revolving mixture-engaging structures to engage the fibers and separate the fibers from the non-fibrous particulates.

The present invention also accomplishes its desired objects by further broadly providing a method for separating elastomeric particulates from fibers in the substantial absence of water comprising the steps of: (a) providing a pulverized elastomeric mixture comprising elastomeric particulates (e.g. plastic particulates, rubber particulates, etc.) and fibers (e.g. natural and/or synthetic and/or metal fibers, etc.); (b) contacting the pulverized elastomeric mixture of step (a) with a first revolving mixture-engaging structure (e.g., a plurality of first revolving spikes) to cause the first revolving mixture-engaging structure to remove fibers and separate elastomeric particulates from the pulverized elastomeric mixture, with the removed fibers having residual elastomeric particulates; and (c) propelling the removed fibers of step (b) against a second revolving mixture-engaging structure (e.g., a plurality of second revolving spikes) to cause the second revolving mixture-engaging structure to engage the removed fibers and separate residual elastomer particulates from the removed fibers.

The present invention more specifically provides a method for separating crumb rubber from polyester fibers in the substantial absence of water comprising the steps of: (a) introducing (e.g. gravity feeding, etc.) a pulverized mixture of crumb rubber and polyester fibers into a separation zone containing a plurality of mixture-engaging structures (e.g., a plurality of revolving spiked cylinders) to separate a portion of the polyester fibers from the pulverized mixture and produce crumb rubber containing residual polyester fibers; and (b) removing the residual polyester fibers from the crumb rubber.

The present invention further accomplishes its desired objects by broadly providing an apparatus for separating non-fibrous particulates from fibers in the substantial absence of water comprising a housing, and a plurality of cylinders rotatably mounted within the housing with each of the cylinders supporting a mixture-engaging structure. A grid-rod assembly is supported by the housing and situated in proximity to the cylinders supporting mixture-engaging structures. A pulverized mixture is disposed in the housing. Preferably, the pulverized mixture is produced from vehicle tires and comprises fibers and crumb rubber. The crumb rubber preferably comprises particles having an average maximum dimension ranging from about 1/512 inch to about 1/8 inch.

It is therefore an object of the present invention to provide an apparatus and a method for separating non-fibrous particulates from fibers.

It is another object of the present invention to provide a method for separating elastomeric particulates from fibers.

It is also another object of the present invention to provide a method for separating crumb rubber from polyester fibers.

These, together with the various ancillary objects and features which will become apparent to those skilled in the art as the following description proceeds, are attained by these novel methods and apparatuses, a preferred embodiment thereof shown with reference to the accompanying drawings, by way of example only, wherein:

DETAILED DESCRIPTION OF THE PREFERRED EMBODIMENT

Figure 1:
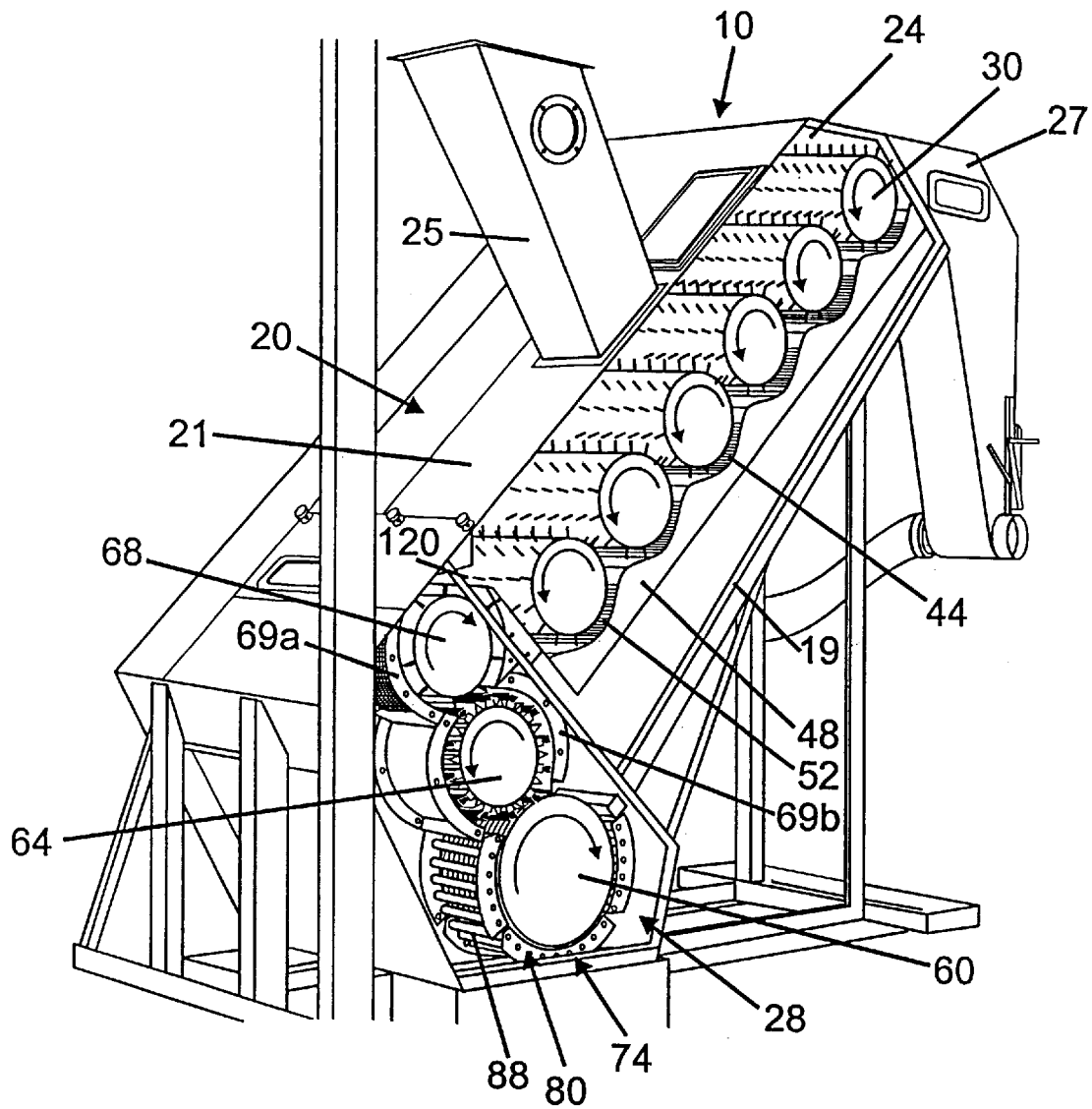
FIG. 1 is a perspective view of the internals of one embodiment of an apparatus which may be employed for conducting the methods of the present invention including receiving a pulverized mixture and separating fibers from the pulverized mixture to produce non-fibrous particulates.

Referring in detail now to the drawings wherein similar parts of the invention are identified by like reference numerals, there is seen an apparatus, generally illustrated as 10, for receiving a pulverized mixture 12 comprising non-fibrous particulates 14 and fibers 16 and for separating the non-fibrous particulates 14 from the fibers 16. A suitable apparatus 10 for conducting the methods of the present invention may be purchased commercially under the trademark TrashMaster®, owned by Lummus Corporation, P.O. Box 4259, Savannah, Ga. 31407-4259.

The pulverized mixture 12 is a mixture resulting from having pulverized or ground a material such that the non-fibrous particulates 14 within the pulverized mixture 12 average less than about 1/8 inch in size, more preferably averages less than about 3/32 inch in size, most preferably average less than about 1/16 inch in size. The stated nominal size of the particles refers to the maximum length or dimension of the particle in any direction, including a length or dimension extending from a point on one side of the particle through the body of the particle to a point on an opposing side of the particle. Thus, the term "less than about 1/8 inch particle" represents a particle having a less than about 1/8 inch diameter spherical shape or any geometric shape wherein the maximum length or dimension is less than about 1/8 inch in any direction. The term "average less than about 1/8 inch particles" represents an average maximum length or dimension of less than about 1/8 inch in any direction for all particles.

The pulverizing or grinding of a material to produce the pulverized mixture 12 may be accomplished in any suitable manner such as by chipping and/or shredding a material into small pieces followed by a hammer-mill or similar process such as cyrogenic comminution that produces the pulverized mixture 12 having the desired average dimensioned particles. The pulverized mixture 12 preferably has a density ranging from about 5 lbs./ft$^3$ to about 30 lbs./ft$^3$, more preferably from about 5 lbs./ft$^3$ to about 20 lbs./ft$^3$, and most preferably from about 10 lbs./ft$^3$ to about 15 lbs./ft$^3$. The pulverized mixture 12 preferably comprises from about 50% by weight to about 90% by weight of the non-fibrous particulates 14, more preferably from about 60% by weight to about 90% by weight non-fibrous particulates 14. Most preferably, the pulverized mixture 12 includes from about 60% by weight to about 80% by weight of the non-fibrous particulates 14. If the pulverized mixture 12 is from vehicle tires, the density of the pulverized mixture 12 will range from about 10 lbs./ft$^3$ to about 14 lbs./ft$^3$ and comprise from about 80% by weight to about 90% by weight crumb rubber. Crumb rubber from vehicle tires typically has a density ranging from about 20 lbs./ft$^3$ to about 26 lbs./ft$^3$. Fibers from vehicle tires generally have a density ranging from about 2 lbs./ft$^3$ to about 6 lbs./ft$^3$.

The separatory process of the present invention is mechanical and pneumatic in nature. While the presence of water at low amounts in the feedstream is not considered detrimental, an increase in water content to the point that it causes binding, or agglomeration of the material being processed is undesirable due to the loss of separation efficiency. The phrase "in the substantial absence of water" is herein defined as that amount of water which does not cause agglomeration of the process feedstream.

The apparatus 10 includes a housing 20 with a top 21 and a bottom 19. Housing 20 has a primary separation zone 24 and a secondary separation or reclaiming zone 28. An inlet chute 25 connects to the housing 20 and communicates with the primary separation zone 24 to provide a path for introducing the pulverized mixture 12 into the primary separation zone 24. An exit chute 27 also connects to the housing 20 and communicates with the primary separation zone 24 for receiving fibers 16 that have been separated from the pulverized material 12. The primary separation zone 24 contains a series of spiked cylinders 30 that are rotatably supported by the housing 20 for being rotatably driven by one or more motors (not shown). Each spiked cylinder 30 has a plurality of spikes 32 protruding outwardly therefrom for contacting and engaging the pulverized mixture 12 including the fibers 16 to separate the fibers 16 from the non-fibrous particulates 14 and to produce a mixture of residual fibers 16r and non-fibrous particulates 14 which is termed "non-fibrous particulate/residual fiber mixture 14a." The spikes 32 have a length ranging from about 1 inch to about 3 inches, a diameter ranging from about ¼ in. to about ¾ in. and revolve When the spiked cylinders 30 revolve. Preferably, the spiked cylinders 30 revolve the spikes 32 at from about 300 r.p.m. to about 1000 r.p.m., more preferably from about 400 r.p.m. to about 800 r.p.m. It is to be understood that while the primary separation zone 24 has been described as having spiked cylinders 30 supporting spikes 32 for engaging the pulverized mixture 12, the spirit and scope of the present invention is to include the primary separation zone 24 as having any type of cylinders supporting any type of mixture-engaging structures for engaging the pulverized mixture 12.

Figure 3:
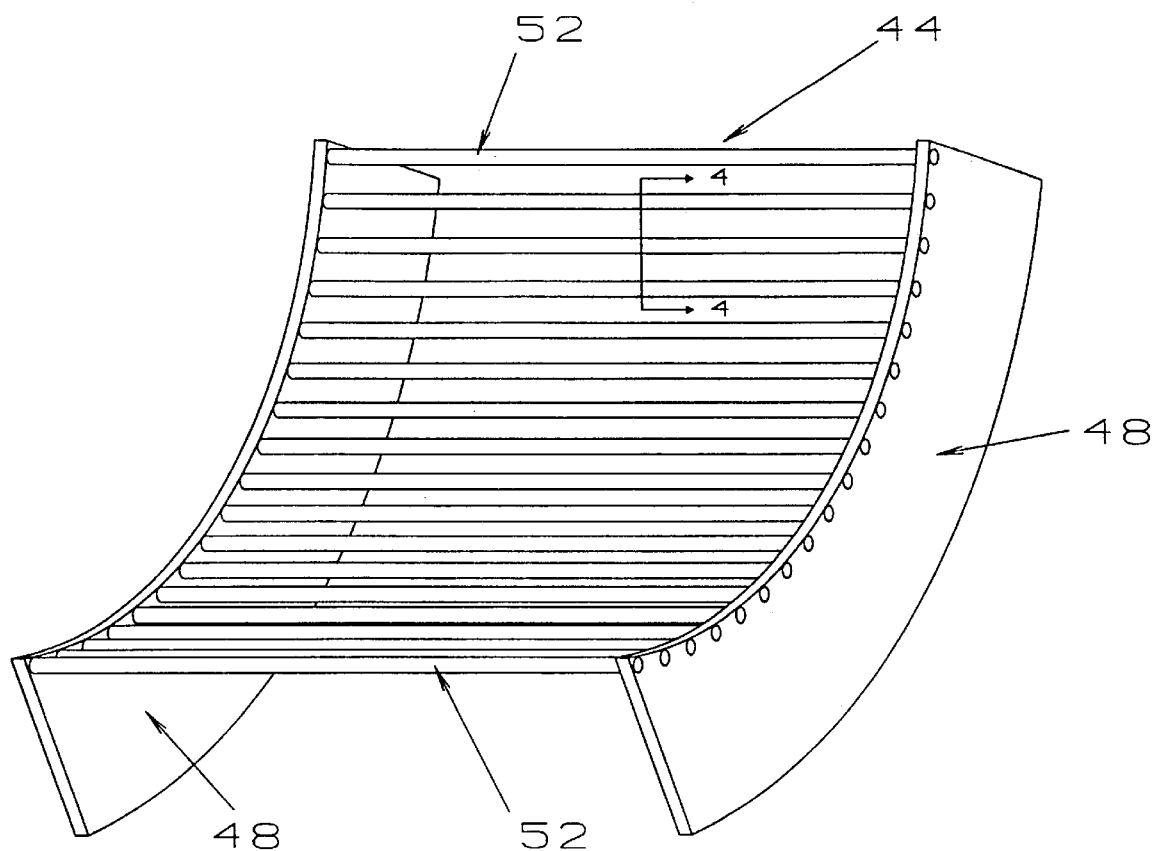
FIG. 3 is a partial enlarged perspective view of the concave grid-bar structure for the apparatus of FIG. 1 having grid openings wherethrough separated non-fibrous particulates pass.
Figure 4:
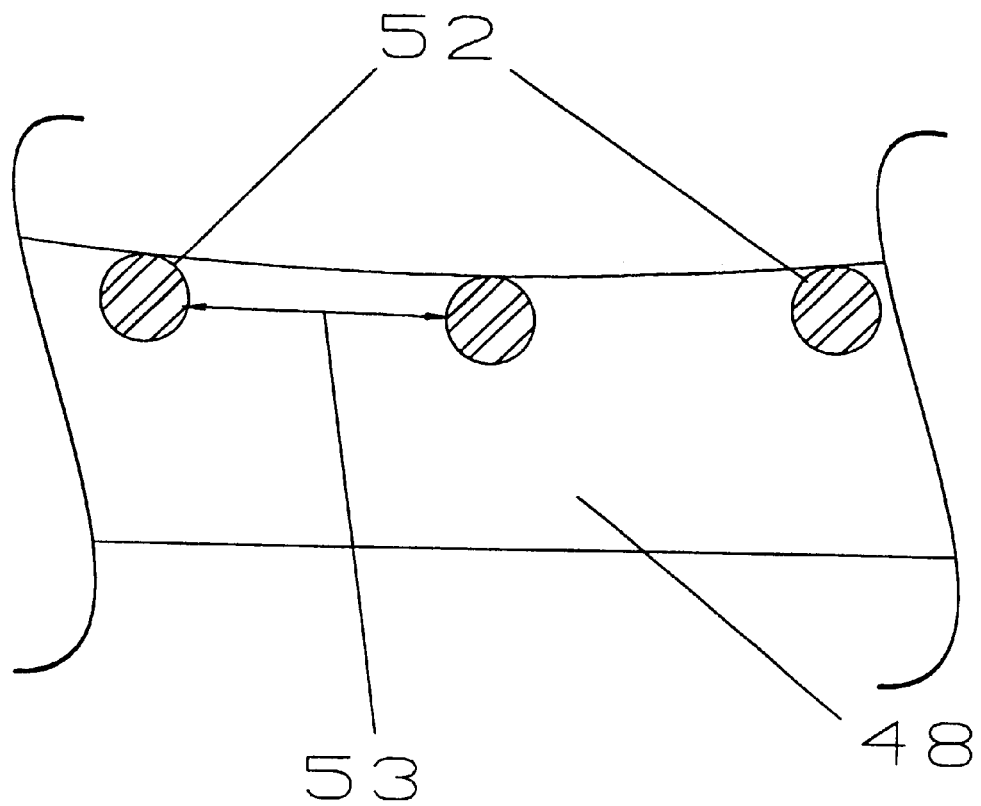
FIG. 4 is a vertical sectional view taken in direction of the arrows and along the plane of line 4—4 in FIG. 3.

The primary separation zone 24 also contains a separating assembly 36 having separating surfaces 40. The separating assembly 36 connects to the housing 20 such that the separating surfaces 40 are disposed in close proximity to the spikes 32 of the spiked cylinders 30. Preferably, the ends of the spikes 32 revolvingly pass from the separating surfaces 40 at a distance ranging from about ¼ inch to about 1 inch. The separating surfaces 40 may be any suitable surface that is capable of cooperating with the spikes 32 to assist in separating non-fibrous particulates 14 from the fibers 16 and to produce the non-fibrous particulate/residual fiber mixture 14a. Preferably, the separating surfaces 40 are provided with openings wherethrough non-fibrous particulates 14 and non-fibrous particulate/residual fiber mixtures 14a pass after being dislodged from the pulverized mixture 12 including the fibers 16. In a preferred embodiment of the present invention, the separating surfaces 40 may be either concave screen or grid rod sections or structures. More preferably and as best shown in FIGS. 1, 3 and 4, the separating surfaces 40 are concave grid-rod structures 44 having a pair of generally parallel arcuate brackets 48–48 interconnected by a plurality of spaced rods 52.

The spaced rods 52 are typically separated by an opening or space 53 that has a dimension ranging from about ⅛ inch to about ¾ inch. Rods 52 generally have a diameter ranging from about ¼ inch to about ¾ inch. As will be further explained below, revolving spikes 32 of the revolving spiked cylinders 30 contact the pulverized mixture 12 and engage the fibers 16 which have entrained and/or trapped non-fibrous particulates 14. While spikes 32 are engaged to the pulverized mixture 12 including the fibers 16 and are being revolved by the revolving spiked cylinders 30, the revolving spikes 32 rub and/or scrub the spike-engaged pulverized mixture 12 including the fibers 16 against the spaced rods 52 of the concave grid-rod structures 44, causing fibers 16 and entrained and trapped non-fibrous particulates 14 to separate from the spike-engaged pulverized mixture 12 and fall through the spaces 53 between any pair of contiguously spaced rods 52. The scrubbing process also produces the non-fibrous particulate/residual fiber mixtures 14a which also fall through the spaces 53.

Figure 6:
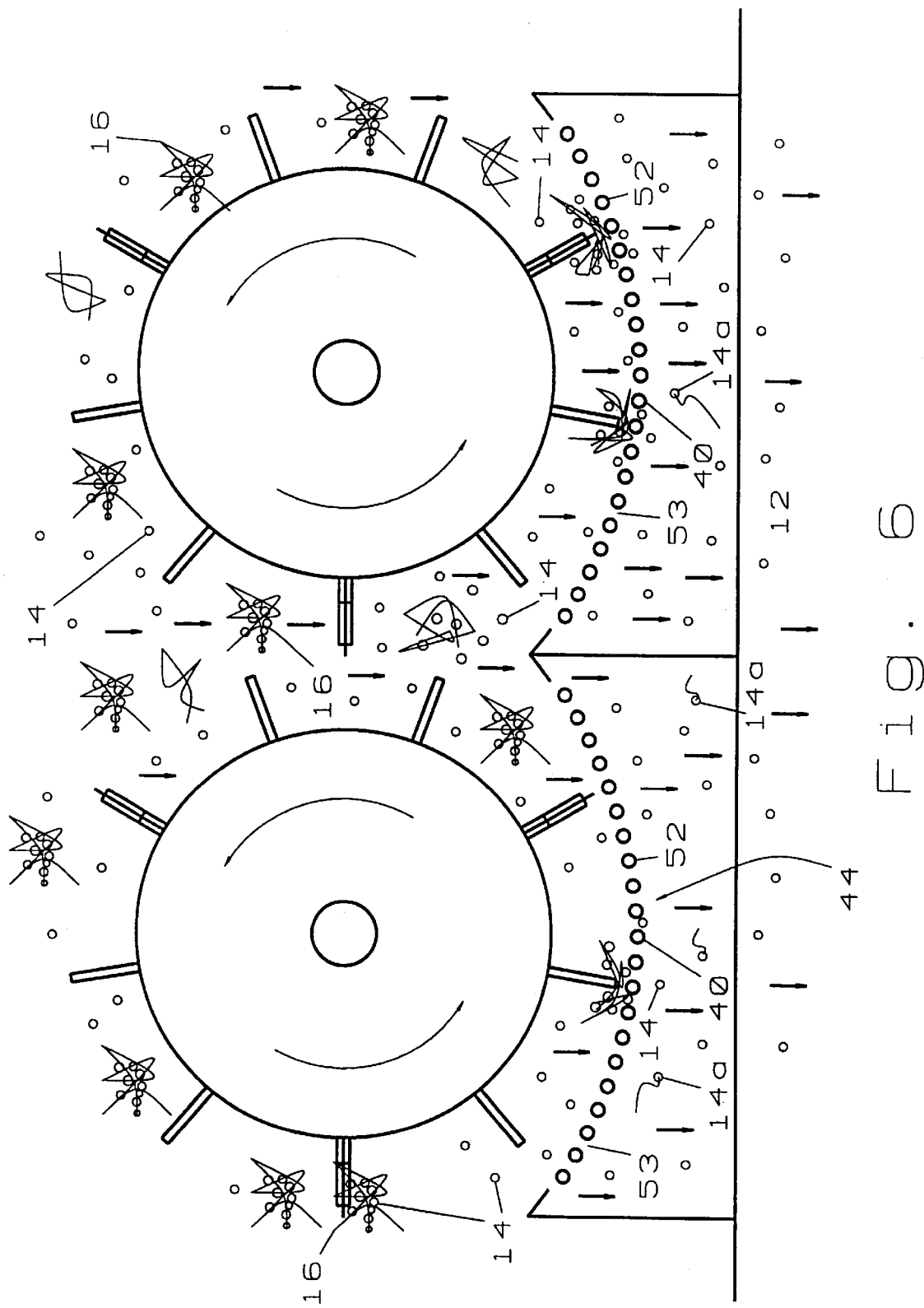
FIG. 6 is an enlarged end elevational view of a pair of rotating spiked cylinders of the apparatus of FIG. 1 including having particulate-containing fibers engaged to the revolving spikes of the rotating spiked cylinders, with some of the particulate-containing fibers being scrubbed against a concave grid-bar structure for loosening and separating particulates which are entrained or trapped within the particulate-containing fibers, and with other particulate-containing fibers being thrown and impelled by one rotating spiked cylinder against the revolving spikes of a contiguous rotating spiked cylinder.

After the spike-engaged pulverized mixture 12 including spike-engaged fibers 16 has been scrubbed through the process of being moved and rubbed against the spaced rods 52, the revolving spikes 32 throw or impel the scrubbed pulverized mixture 12 into the revolving spikes 32 of an adjacent revolving spiked cylinder 30. The centrifugal force from the revolving spikes 32 causes the spiked-engaged pulverized mixture 12 to slide off the revolving spikes 32 and be impaled by the revolving spikes 32 of the adjacent revolving spiked cylinder 30, as best shown in FIG. 6. The process of scrubbing and subsequently impelling pulverized mixture 12 particularly including fibers 16, is continued until the last of the series of revolving spiked cylinders 30 is reached, whereupon the remaining separated fibers 16 are thrown and/or passed into the exit chute 27. The separated fibers 16 passing into the exit chute 27 usually contain some non-fibrous particulates 14 which did not separate in the primary separation zone 24. Each time spiked-engaged pulverized mixture 12, including spiked-engaged fibers 16, is scrubbed and impelled into revolving spikes 32 of an adjacent revolving spiked cylinder 30, non-fibrous particulates 14 and non-fibrous particulate/residual fiber mixtures 14a are removed or separated and fall through the spaces 53 within the grid-rod structures 44 onto the bottom 19 of the housing 20 where they slide downwardly toward and into the reclaiming zone 28.

The secondary separation or reclaiming zone 28 of the apparatus 10 communicates with the primary separation zone 24 for receiving non-fibrous particulates 14 and non-fibrous particulate/residual fiber mixtures 14a produced in the primary separation zone 24. The reclaiming zone 28 receives non-fibrous particulates 14 and removes and reclaims residual fibers 16r from the non-fibrous particulate/residual fiber mixtures 14a. The reclaiming zone 28 preferably contains a saw cylinder 60, a doffing brush cylinder 64, and a spiked cylinder 68, all of which are rotatably supported by the housing 20 and form part of the residual fiber transporting and/or reclaiming system. A pair of opposed sleeves or walls 69a and 69b connect to the housing 20 in a manner to form a spatial relationship with doffing brush cylinder 64 and spiked cylinder 68. The cylinders 60, 64 and 68 are rotatably driven by one or more motors (not shown). An auger 71 (see FIG. 2) may be conveniently rotatably disposed within the reclaiming zone 28 for assisting in the removal of produced non-fibrous particulates 14 from the apparatus 10.

Figure 5:
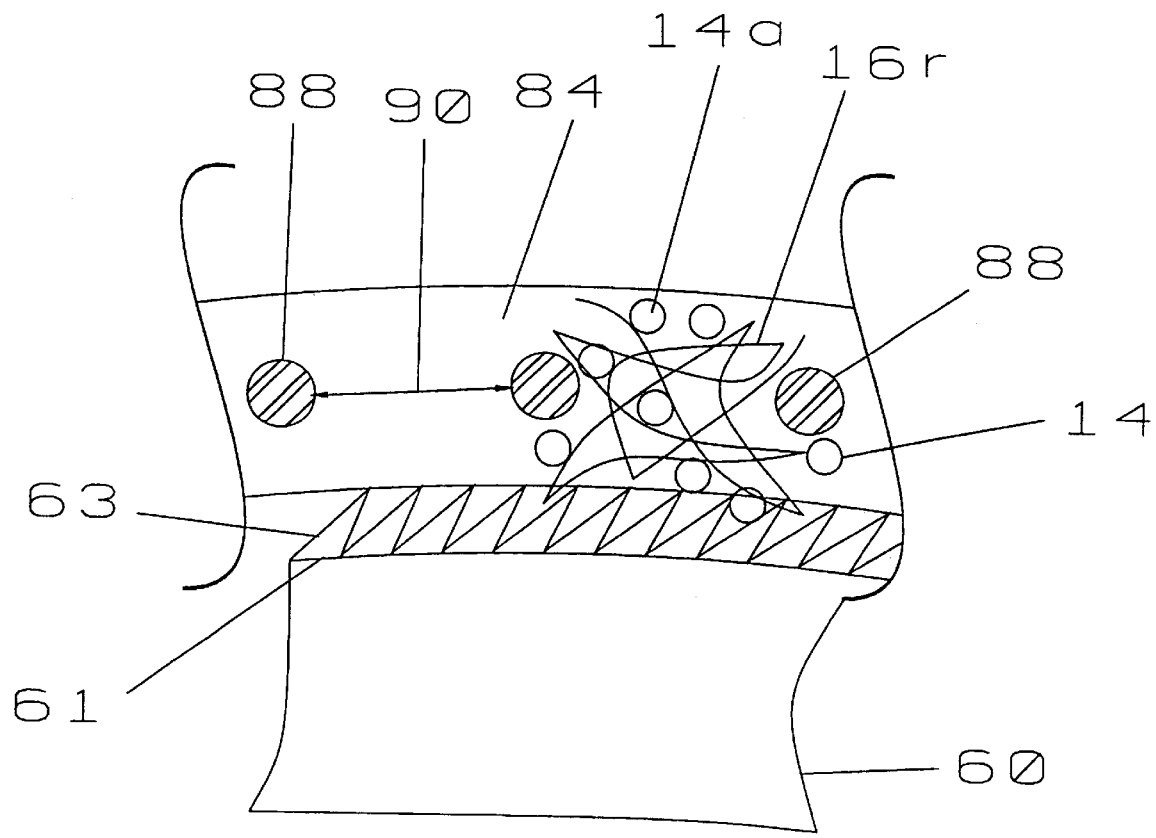
FIG. 5 i a partial vertical sectional view of the grid structure which partially surrounds the fiber-engaging saw cylinder in the reclaiming section of the apparatus in FIG. 1.

The saw cylinder 60 has a surface 61 which supports a plurality of teeth 63. The teeth 63 engage the non-fibrous particulate/residual fiber mixtures 14a for functioning as a fiber-engaging assembly. A reclaiming separating assembly 74 is connected to the housing 20 and has reclaiming separating surfaces 76. The reclaiming separating assembly 74 is disposed in the reclaiming zone 28 such that the reclaiming separating surfaces 76 are closely spaced from the teeth 63. Preferably, teeth 63 are separated from the reclaiming separating surfaces 76 at a distance ranging from about ⅛ inch to about 1 inch. The reclaiming surfaces 76 may be any suitable surface that is capable of cooperating with teeth 63 to assist in removing and separating residual fibers 16r from the non-fibrous particulate/residual fiber mixtures 14a. In a preferred embodiment of the invention, the reclaiming separating surfaces 76 may be either concave screen structures or concave grid-rod structures, more preferably and as best shown in FIGS. 1, 5 and 6, concave grid-rod structures 80 having a pair of generally parallel arcuate brackets 84–84 interconnected by a plurality of spaced rods 88 which are typically separated by an opening or space 90 (see FIG. 5) that has a dimension ranging from about ⅛ inch to about ¾ inch. The spaced rods 88 each have a diameter that typically ranges from about ¼ inch to about ¾ inch.

The revolving teeth 63 of the rotating saw cylinder 60 contact and engage produced non-fibrous particulate/ residual fiber mixtures 14a. While the teeth 63 are engaged to the non-fibrous particulate/residual fiber mixtures 14a including residual fibers 16r and are being revolved by the rotating saw cylinder 60, the teeth 63 rub and/or scrub the engaged non-fibrous particulate/residual fiber mixtures 14a against the spaced rods 88 of the concave grid-rod structures 80, causing non-fibrous particulates 14 to separate from the non-fibrous particulate residual fiber mixtures 14a and fall through the spaces 90 between any pair of contiguously spaced rods 88. After the non-fibrous particulate/residual fiber mixtures 14a have been scrubbed on the spaced rods 88, the mixtures 14a are removed from the teeth 63 of the saw cylinder 60 by the doffing brush cylinder 64. While the reclaiming zone 28 has been described as having the saw cylinder 60 supporting teeth 63 for engaging the produced non-fibrous particulate/residual fiber mixtures 14a, it is to be understood that the spirit and scope of the present invention is to include the reclaiming zone 28 as having any type of cylinder supporting any type of mixture-engaging structure for engaging the produced non-fibrous particulate/residual fiber mixtures 14a.

The doffing brush cylinder 64 has a surface 94 supporting a plurality of brush assemblies 96 and a plurality of angled-metal members 98, as best shown in FIG. 6. The brush assemblies 96 revolve with the revolving doffing brush cylinder 64 and contact non-fibrous particulate/residual fiber mixtures 14a mounted on the teeth 63 of the saw cylinder 60 to brush off and remove the mixtures 14a from the teeth 63. During the process of mixtures 14a being removed from the teeth 63 by the brush assemblies 96 and subsequently being engaged to and revolving with the brush assemblies 96, additionally non-fibrous particulates 14 are being removed from the non-fibrous particulate/residual fiber mixtures 14a. It is to be understood that while the reclaiming zone 28 has been described as having the doffing brush cylinder 64 supporting a plurality of brush assemblies 96 for removing non-fibrous particulate/residual fiber mixtures 14a from the saw cylinder 60, the spirit and scope of the present invention is to include the reclaiming zone 28 as having any type of cylinder supporting any type of mixture-engaging structure for removing the mixtures 14a from the saw cylinder 60.

The spiked cylinder 68 has a surface 100 supporting a plurality of spikes 102 for revolving as the spiked cylinder 68 rotates in order to contact the brush assemblies 96 of the doffing brush cylinder 64 for removing therefrom non-fibrous particulate/residual fiber mixtures 14a. Revolving spikes 102 of the spiked is cylinder 68 then centrifugally throws or impels the non-fibrous particulate/residual fiber mixtures 14a through a recycle opening 120 between the top 21 of the housing 20 if and one of the walls 69 (see FIG. 6). The recycle opening 120 is an opening where material, such as any remaining non-fibrous particulate/residual fiber mixtures 14a, is recycled into the primary separation zone 24. During the process of mixtures 14a being removed from the brush assemblies 96 by the spikes 102 and subsequently being engaged to and revolving with the spikes 102, additionally non-fibrous particulates 14 are being removed from the mixtures 14a. While the reclaiming zone 28 has been described as having a spiked cylinder 68 supporting spikes 102 for removing non-fibrous particulate/residual fiber mixtures 14a from the doffing brush cylinder 64 and impelling the same through recycle opening 120, it is to be understood that the spirit and scope of the present invention is to include the reclaiming zone 28 as having any type of cylinder supporting any type of mixture-engaging structure for removing the mixtures 14a from the doffing brush cylinder 64 and impelling the same through recycle opening 120.

In a preferred embodiment of the present invention, from about 60% by weight to about 90% by weight, preferably from about 80% to about 90% by weight, of the non-fibrous particulates 14 within the pulverized mixture 12 are removed in the primary separation zone 24. The removed non-fibrous particulates 14 are represented by pure non-fibrous particulates 14 and those non-fibrous particulates 14 contained in non-fibrous particulate/residual fiber mixtures 14a. The reclaiming zone 28 removes or extracts residual from the non-fibrous particulate/residual fiber mixtures 14a and recycles or recirculates the extracted fibers 16r through opening 120 and into the primary separation zone 24.

The non-fibrous particulates 14 for the present invention may be any type of particulates that are capable of being separated from the pulverized mixture 12. Preferably, the non-fibrous particulates 14 comprise elastomeric particulates, such as plastic particulates (e.g. polyethylene, polypropylene, etc.) and rubber particulates. The rubber particulates include particulates of natural rubber such as polyisoprene, both crude (unvulcanized) polyisoprene and cured (vulcanized polyisoprene, i.e., sulfur cross-linkages). The rubber particulates also include particulates of synthetic rubber, such as by way of example only: sodium polysulfide, polychloroprene, butadiene-styrene copolymers (SBR), acrylonitrilebutadiene copolymers (nitrile rubber), ethylenepropylene-diene (EPDM) rubbers, synthetic polyisoprene, butyl rubber (copolymer of isobutylene and isoprene), polyacrylonitrile, silicone (polysiloxane), epichlorohydrin, and polyurethane.

The fibers 16 for the present invention may be any type of fibers that are capable of being separated from the pulverized mixture 12 to produce non-fibrous particulates 14 and non-fibrous particulate/residual fiber mixtures 14a. Fibers 16 are typically characterized by relatively high tenacity and have a high ratio of length to diameter (e.g. several hundred to one). Suitable fibers 16 include natural fibers, semisynthetic fibers, synthetic fibers, and metal fibers. Natural fibers are animal, such as wool and silk (proteins); vegetable, such as cotton (cellulose); and mineral (asbestos). Semisynthetic fibers include rayon and inorganic substances extruded in fibrous form, such as glass, boron, boron carbide, boron nitride, carbon, graphite, aluminum silicate, fused silica and some metals (steel). Synthetic fibers are made from high polymers (polyamides, polyesters, acrylics, and polyolefins) by extruding from spinnerets. Metal fibers are made from suitable metals, such as tungsten, cobalt, tantalum and other metals, including alloys of the metals. Metal fibers also include steel fibers, such as steel for tire cords.

In a preferred embodiment of the present invention the pulverized mixture 12 is a mixture resulting from having triturated, pulverized or comminuted vehicle tires, such as used automobile and truck vehicle tires. Vehicle tires are collected and chopped into tire pieces of desired dimensions, such as 2 inches by 2 inches pieces. The tire pieces are then reduced in size, such as by cryogenic disintegration, grinding, etc., into rubber particles having an average maximum length or dimensions ranging from about $1/512$ in. to about $1/4$ in., more preferably from about $1/32$ in. to about $1/8$ in., and most preferably from about $1/64$ in. to about $1/16$ in. Fine sized rubber particles are desired such that when recovered, they are suitable for reuse in the manufacture of rubber articles. Artisans skilled in the art are aware that very finely divided rubber particles are essential if the crumb rubber product of tire comminution processes can be sold to rubber and rubber application manufacturers. The rubber particulates produced from having pulverized vehicle tires would be synthetic rubber particulates loaded with carbon black. It is well known in the art that carbon black is finely divided forms of carbon made by the incomplete combustion or thermal decomposition of natural gas or petroleum oil. The fibers produced from having pulverized vehicle tires are typically polyester fibers which comprise long chain synthetic polymers composed of an ester of a dihydric alcohol and terephthalic acid. These fibers may be recovered from the pulverized mixture 12 and may be reused for any suitable purpose, such as in manufacturing vehicle tires.

Figure 2:
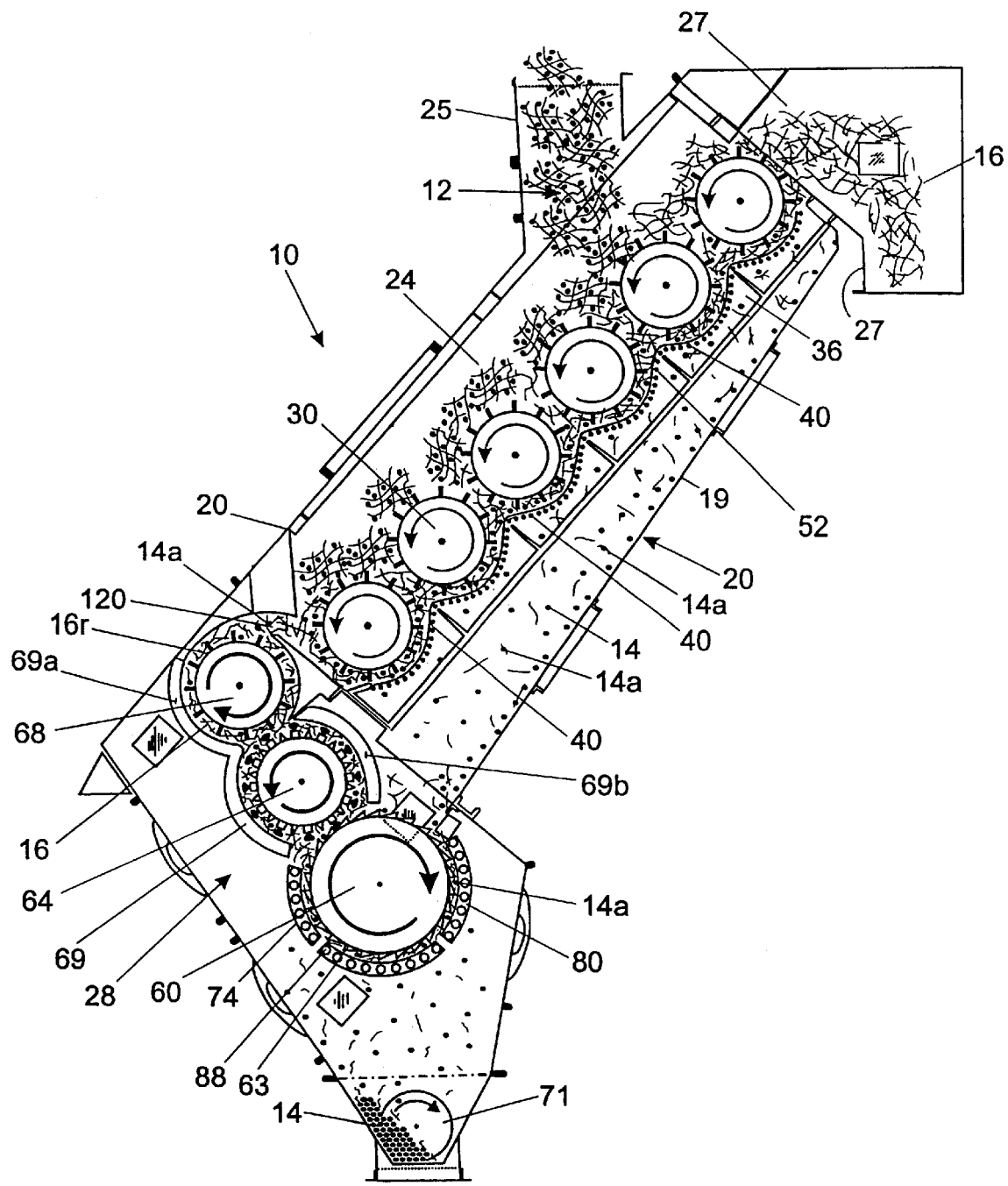
FIG. 2 is a schematic diagram of another embodiment of an apparatus for receiving a pulverized mixture and separating fibers from the pulverized mixture to produce non-fibrous particulates.
Figure 7:
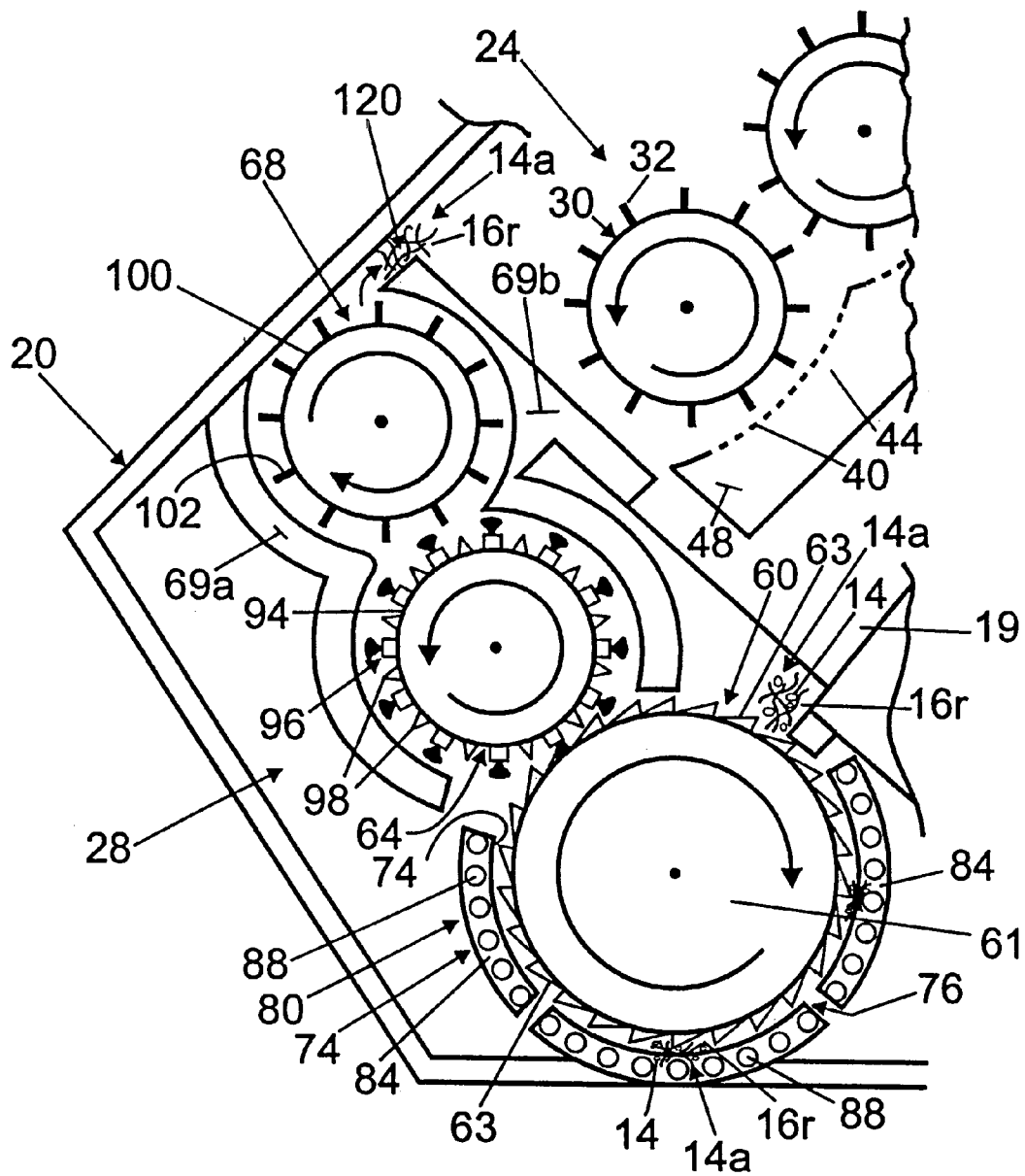
FIG. 7 is an enlarged side elevational view of the reclaiming section of the apparatus of FIG. 1.

Continuing to refer in detail to the drawings for operation of the invention and the method for separating non-fibrous particulates 14 from fibers 16, the pulverized mixture 12 is introduced into the primary separation zone 24 of the apparatus 10 through the inlet chute 25. The introduction of the pulverized mixture 12 may be in any suitable manner, such as by gravity feeding, pneumatically, mechanical conveying, etc. Preferably, the pulverized mixture 12 is introduced by gravity feeding and allowing the pulverized mixture 12 to free fall through the inlet chute 25 for minimizing the non-fibrous particulates 14 from becoming airborne. The arrows inside each cylinder represent the direction of rotation of that cylinder, and hence the direction of rotation of the teeth or spikes or other structure attached thereon. Thus, and as best shown in FIGS. 2 and 7, spiked cylinders 30 and doffing brush cylinder 64 rotate in the same direction. Saw cylinder 60 and spiked cylinder 68 also rotate in the same direction, but in a direction opposite to the direction of rotation of spiked cylinders 30 and doffing brush cylinder 64.

The pressure inside apparatus 10 is at about atmospheric pressure (i.e. 14.7 psi) or less than about atmospheric pressure, such as a slight vacuum ranging from about 8 psi to about 13 psi. The introduced pulverized mixture 12 comes in contact with the revolving spiked cylinders 30, causing the revolving spikes 32 of the revolving spiked cylinders 30 to come in contact and engage the pulverized mixture 12 including fibers 16. As the spike-engaged pulverized mixture 12 including fibers 16 is revolved by the revolving spikes 32 on the rotating spiked cylinders 30, entrapped and/or entrained non-fibrous particulates 14 commence separating from the spike-engaged pulverized mixture 12 including the fibers 16. As the revolving spiked cylinders 30 continue rotating, any pulverized mixture 12 including fibers 16 which are engaged to revolving spikes 32 are rubbed and/or scrubbed against the plurality of spaced rods 52 of the concave grid-rod structures 44. This further causes entrained and/or trapped non-fibrous particulates 14 to separate from the spiked-engaged pulverized mixture 12 including the fibers 16 and fall through the spaces 53 between any pair of contiguously spaced rods 52. As was previously mentioned, this scrubbing procedure also produces the non-fibrous particulate/residual fiber mixtures 14a which also fall through the spaces 53. The separated non-fibrous particulates 14 and non-fibrous particulate/residual fiber mixtures 14a contact the bottom 19 of the housing 20 and commence sliding downwardly towards the reclaiming section 28; more specifically, towards the saw cylinder 60 within the reclaiming section 28.

After the spiked-engaged pulverized mixture 12 (including spiked-engaged fibers 16) have been scrubbed through the process of being rubbed or moved against the space rods 52, the scrubbed pulverized mixture 12 is thrown or impelled by the revolving spikes 32 into the revolving spikes 32 of an adjacent revolving spiked cylinder 30 (see FIG. 6). The centrifugal force from the revolving spikes 32 causes the spike-engaged pulverized mixture 12 to slide off the revolving spikes 32 and be thrown into the revolving spikes 32 of the adjacent revolving spiked cylinder 30. The throwing or impelling of scrubbed pulverized mixture 12 is facilitated by the fact that a portion of the non-fibrous particulates 14 has been removed therefrom, thus reducing the density of the spike-engaged pulverized mixture 12. Stated alternatively, the post-scrubbed pulverized mixture 12 is lighter than the pre-scrubbed pulverized mixture 12 because of having less non-fibrous particulates 14.

The process of scrubbing and subsequently impelling pulverized mixture 12 including fibers 16 is continued until the last spiked cylinder 30 in proximity to the exit chute 27 is reached (see FIG. 2). The last spiked cylinder 30 throws or impels the remaining fibers 16 into the exit chute 27. Each time spiked-engaged pulverized mixtures 12 including spike-engaged fibers 16 are scrubbed and impelled into revolving spikes 32 of an adjacent revolving spiked cylinder 30, non-fibrous particulates 14 along with non-fibrous particulate/residual fiber mixtures 14a are removed or separated and fall through the spaces 53 and onto the bottom 19 of the housing 20. As previously mentioned, the separated non-fibrous particulates 14 and non-fibrous particulate/residual fiber mixtures 14a slide down the bottom 19 of housing 20 and fall between the revolving saw cylinder 60 and the grid-rod structures 80 associated therewith. The separated non-fibrous particulates 14 subsequently fall into the bottom of the reclaiming zone 28.

Teeth 63 of saw cylinder 60 engage the non-fibrous particulates/residual fiber mixtures 14a and scrub the same against the plurality of spaced rods 88, causing non-fibrous particulates 14 to separate from the mixtures 14a. After scrubbing, the mixtures 14a are removed from the teeth 63 of the saw cylinder 60 by the brush assemblies 96 of the doffing brush cylinder 64. The brush assemblies 96 revolve with the revolving doffing brush cylinder 64 and function for removing and/or brushing off the remaining non-fibrous particulate/residual fiber mixtures 14a from the teeth 63 of the revolving saw cylinder 60. From the brush assemblies 96, the mixtures 14a are removed by coming in contact with revolving spikes 102 of the revolving spiked cylinder 68. After revolving spikes 102 remove the remaining non-fibrous particulate/residual fiber mixtures 14a from the brush assemblies 96, they throw or impel the mixtures 14a through the recycle opening 120 between the top 21 of the housing 20 and the upper surface of one of the walls 69 (see FIGS. 2 and 6). Mixtures 14a are then recycled through the primary separation zone 24 such that residual fibers 16r may be reclaimed from the remaining non-fibrous particulate/residual fiber mixtures 14a and passed into the exit chute 27. Also, any non-fibrous particulates 14 which are contained within the remaining mixtures 14a which pass through the opening 120 may be recovered in the primary separation zone 24. The auger 71 conveniently removes non-fibrous particulates 14 from the reclaiming zone 28.

In a preferred embodiment of the present invention, from about 60% to about 90% of the non-fibrous particulates 14 are recovered from the pulverized mixture 12 by the methods of the present invention. Thus, if the pulverized mixture 12 has a density of about 10 lbs. per cubic foot with 70% of the pulverized mixture being non-fibrous particulates 14, then from about 4.2 lbs. to about 6.3 lbs. of non-fibrous particulates 14 are recovered for each cubic foot of pulverized mixture 12 processed in accordance with the methods of the present invention. More preferably, from about 80% to about 90%, most preferably from about 85% to about 90%, of the non-fibrous particulates 14 are recovered from the pulverized mixture 12 being processed in accordance with the methods of the present invention.

The invention will be illustrated by the following example which is being given to set forth the presently known best mode and by way of illustration only and not by way of any limitation. All parameters such as concentrations, mixing proportions, pressure, rates, compounds, etc., submitted in this example are not to be construed to unduly limit the scope of the invention.

EXAMPLE

The apparatus 10 shown in FIG. 1 was used to process approximately 1000 lbs. of pulverized vehicle tires having a density of about 10 lbs. per cubic foot. Approximately 70% (i.e., 700 lbs.) of the 1000 lbs. pulverized mixture of tires was crumb rubber. The spiked cylinders 30 were about 14 inches in diameter and rotated at approximately 500 r.p.m. The spikes 102 of the spiked cylinders 30 were about 5/16 inch in diameter and had a length of about 1 3/8 inch. The spaced bars 52 had a diameter of approximately 3/8 of an inch and were spaced at about 5/8 of an inch. The saw cylinder 60 was 17 inches in diameter (plus the saw segments) and was rotated at 300 r.p.m. and in a direction opposite to the direction of rotation of the spiked cylinders 30. The doffing brush cylinder 64 was about 14 3/4 inches in diameter and rotated at approximately 650 r.p.m. in direction of the spiked cylinders 30, and the spiked cylinder 68 was rotated in direction of the saw cylinder 60 at about 600 r.p.m. Thus, with respect to the view illustrated in FIG. 1, the spiked cylinders 30 and the doffing brush cylinder 64 were rotated counterclockwise, and the saw cylinder 60 and the spiked cylinder 68 were rotated clockwise. The rods 88 of the reclaiming grid-rod section 80 had a diameter of about 1 inch and were spaced at approximately 1 inch apart. The apparatus 10 had a slight vacuum of approximately 12 psi. The pulverized tire mixture was introduced through the inlet chute 25 by gravity feeding.

After the 1000 lbs. of pulverized vehicle tires were processed, 700 lbs. of material was recovered from the reclaiming zone 28 and 300 lbs. of material was recovered from the exit chute 27. Of the recovered 700 lbs., about 75% or 525 lbs. was crumb rubber. Twenty-five percent (25%) or 175 lbs. was residual polyester fibers. Of the 300 lbs. recovered from the exit chute 27, about 20% or 60 lbs. was residual crumb rubber and approximately 80% or 240 lbs. was polyester fibers.

CONCLUSION

Thus, by the practice of the present invention there is provided a method for separating non-fibrous particulates 14 (e.g. elastomeric particulates including crumb rubber, etc.) from fibers 16 (e.g. polyester fibers, etc.). A pulverized mixture 12 is introduced into the separation zone 24 containing a plurality of revolving spiked cylinders 30 to separate a portion of the fibers 16 from the pulverized mixture 12 and to produce non-fibrous particulates 14 which typically contain residual fibers 16r. The residual fibers 16r may be removed in the reclaiming zone 28 to produce additional non-fibrous particulates 14. When the pulverized mixture 12 is pulverized vehicle tires, the non-fibrous particulates 14 produced therefrom is crumb rubber which may be packaged in bulk and recycled and sold as rubber instead of being dumped into landfill or otherwise indiscriminately discarded. The recovered fiber 16 may be packaged into bales for subsequent shipment and recycling.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the spirit and scope of the invention as set forth. Therefore, many modifications may be made to adapt a particular situation or material to the teachings of the invention without departing from the essential spirit and scope of the present invention. It is intended that the invention not be limited to the particular embodiment disclosed as the best mode contemplated for carrying out this invention, but that the invention will include all embodiments and equivalents falling within the scope of the appended claims.

I claim:

1. A method for separating non-fibrous particulates from fibers in the substantial absence of water comprising the steps of:
   (a) providing a pulverized mixture comprising non-fibrous particulates and fibers; and
   (b) contacting the pulverized mixture of step (a) with a plurality of revolving mixture-engaging structures to cause the revolving mixture-engaging structures to engage the fibers and separate the fibers from the non-fibrous particulates.

2. The method of claim 1 additionally comprising scrubbing the fibers.

3. The method of claim 2 wherein said plurality of revolving mixture-engaging structures comprises a plurality of revolving spikes and said scrubbing of the fibers comprises moving the fibers against a generally concave structure while the revolving spikes engage the fibers.

4. The method of claim 2 wherein said scrubbing of the fibers comprises rubbing the fibers against a generally concave grid-rod structure having grid openings wherethrough separated non-fibrous particulates pass.

5. A method for separating elastomeric particulates from fibers in the substantial absence of water comprising the steps of:
   (a) providing a pulverized elastomeric mixture comprising elastomeric particulates and fibers;
   (b) contacting the pulverized elastomeric mixture of step (a) with a first revolving mixture-engaging structure to cause the first revolving mixture-engaging structure to remove fibers and separate elastomeric particulates from the pulverized elastomeric mixture, with the removed fibers having residual elastomeric particulates; and
   (c) propelling the removed fibers of step (b) against a second revolving mixture-engaging structure to cause the second revolving mixture-engaging structure to engage the removed fibers and separate residual elastomer particulates from the removed fibers.

6. The method of claim 5 additionally comprises scrubbing the removed fibers prior to said propelling step (c).

7. The method of claim 6 wherein said first revolving mixture-engaging structure comprises a plurality of first revolving spikes and said scrubbing of the removed fibers comprises moving the removed fibers against a generally concave structure while the first revolving spikes engage the removed fibers.

8. The method of claim 6 wherein said scrubbing of the removed fibers comprises rubbing the removed fibers against a generally concave grid-rod structure having grid openings wherethrough separated elastomeric particulates pass.

9. The method of claim 5 additionally comprising scrubbing the removed fibers after said propelling step (c).

10. A method for separating crumb rubber from polyester fibers in the substantial absence of water comprising the steps of:
  (a) introducing a pulverized mixture of crumb rubber and polyester fibers into a separation zone containing a plurality of revolving mixture-engaging structures to separate a portion of the polyester fibers from the pulverized mixture and produce crumb rubber containing residual polyester fibers; and
  (b) removing the residual polyester fibers from the crumb rubber.

11. The method of claim 10 wherein said introducing step (a) comprises gravity feeding said pulverized mixture into said separation zone.

12. The method of claim 10 wherein said removing step (b) comprises contacting the produced crumb rubber of step (a) with a fiber-engaging assembly of a first revolving cylinder such that residual polyester fibers adhere to the fiber-engaging assembly of the first revolving cylinder.

13. The method of claim 12 wherein said revolving mixture-engaging structures revolve in a first direction and said first revolving cylinder revolves in a second direction opposite to said first direction.

14. The method of claim 13 additionally comprising removing residual polyester fibers from the fiber-engaging assembly of the first revolving cylinder.

15. The method of claim 14 wherein said removing of residual polyester fibers from the fiber-engaging assembly of the first revolving cylinder comprises contacting the residual polyester fibers with a fiber-removing assembly supported by a second revolving cylinder such that the residual polyester fibers are transferred from the fiber-engaging assembly of the first revolving cylinder to the fiber-removing assembly of the second revolving cylinder.

16. The method of claim 15 additionally comprising removing the residual polyester fibers from the fiber-removing assembly of the second revolving cylinder.

17. The method of claim 16 additionally comprising transferring the residual polyester fibers removed from the fiber-removing assembly of the second revolving cylinder into the separation zone of step (a).

18. The method of claim 16 wherein said second revolving cylinder revolves in said first direction.

19. The method of claim 10 wherein said removing step (b) comprises scrubbing the residual polyester fibers.

20. The method of claim 19 wherein said scrubbing of the residual polyester fibers comprises rubbing the residual polyester fibers against a generally concave grid-rod structure.

* * * * *